United States Patent [19]
Rebordosa et al.

[11] Patent Number: 5,379,953
[45] Date of Patent: Jan. 10, 1995

[54] CHOPPING AND MIXING DEVICE FOR MULTI-PURPOSE FOOD PROCESSOR

[75] Inventors: Antonio Rebordosa, Oberursel; Jürgen Golob, Friedrichsdorf, both of Germany

[73] Assignee: Braun AG, Frankfurt, Germany

[21] Appl. No.: 58,322

[22] Filed: May 6, 1993

[30] Foreign Application Priority Data

May 16, 1992 [DE] Germany .................... 4216335

[51] Int. Cl.⁶ .................. A47J 43/06; B02C 18/08; B02C 18/24; B02C 23/02
[52] U.S. Cl. ................. 241/101.2; 241/199.12
[58] Field of Search ............ 241/98, 100, 101.2, 241/101.6, 101.8, 199.7, 199.12; D7/378

[56] References Cited

U.S. PATENT DOCUMENTS

| | | |
|---|---|---|
| 2,003,829 | 6/1935 | Gilbert et al. . |
| 3,393,900 | 7/1968 | Wagner et al. . |
| 4,613,086 | 9/1986 | Granum et al. ............. 241/101.2 X |
| 4,784,338 | 11/1988 | Saladin ....................... 241/199.7 X |
| 5,271,572 | 12/1993 | Grandi ....................... 241/199.12 X |

FOREIGN PATENT DOCUMENTS

| | | |
|---|---|---|
| 0217132B1 | 4/1987 | European Pat. Off. . |
| 0217132 | 4/1987 | European Pat. Off. . |
| 0324115 | 7/1989 | European Pat. Off. . |
| 1053466 | 4/1952 | France . |
| 1207070 | 6/1958 | France . |
| 1224007 | 1/1964 | Germany . |
| 1529257 | 8/1966 | Germany . |
| 2553511 | 11/1975 | Germany . |
| 2546149 | 4/1976 | Germany . |
| 3404348A1 | 2/1984 | Germany . |
| 2621596.5 | 1/1988 | Germany . |
| 112849 | 5/1966 | Netherlands . |

*Primary Examiner*—Douglas D. Watts
*Attorney, Agent, or Firm*—Fish & Richardson

[57] ABSTRACT

The invention is directed to a chopping and mixing device comprising a gear arrangement (4) including a gear arm (12) and adapted to be mounted in a bowl (19), the gear arrangement further including an input shaft (32) driven by a motor-powered main shaft (6), and an output shaft (24) mounted on the gear arm (12) outside the input shaft (32) and engageable with at least one processing tool (5) rotary about its axis (47) for performing food processing operations. According to the invention, the processing tool (5) is formed by at least one rotary cutter (50) for puréeing, blending and/or chopping food materials.

17 Claims, 3 Drawing Sheets

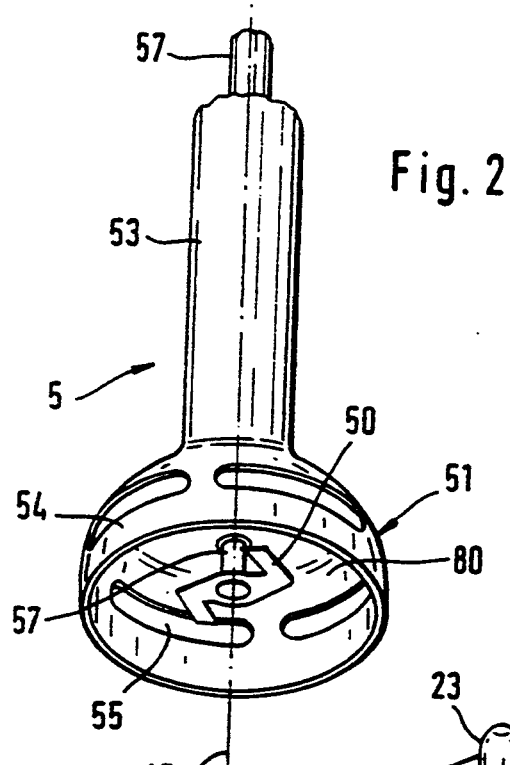
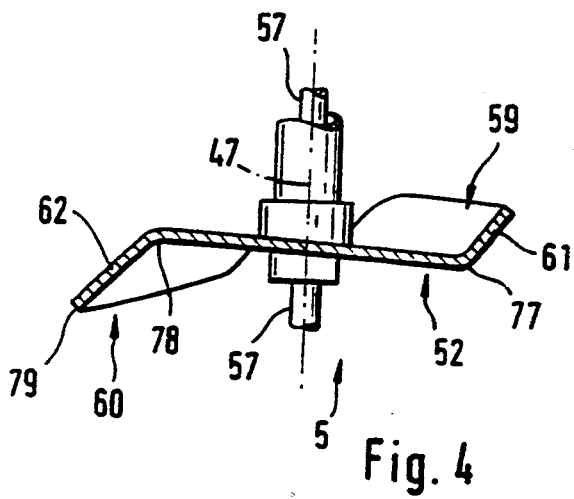
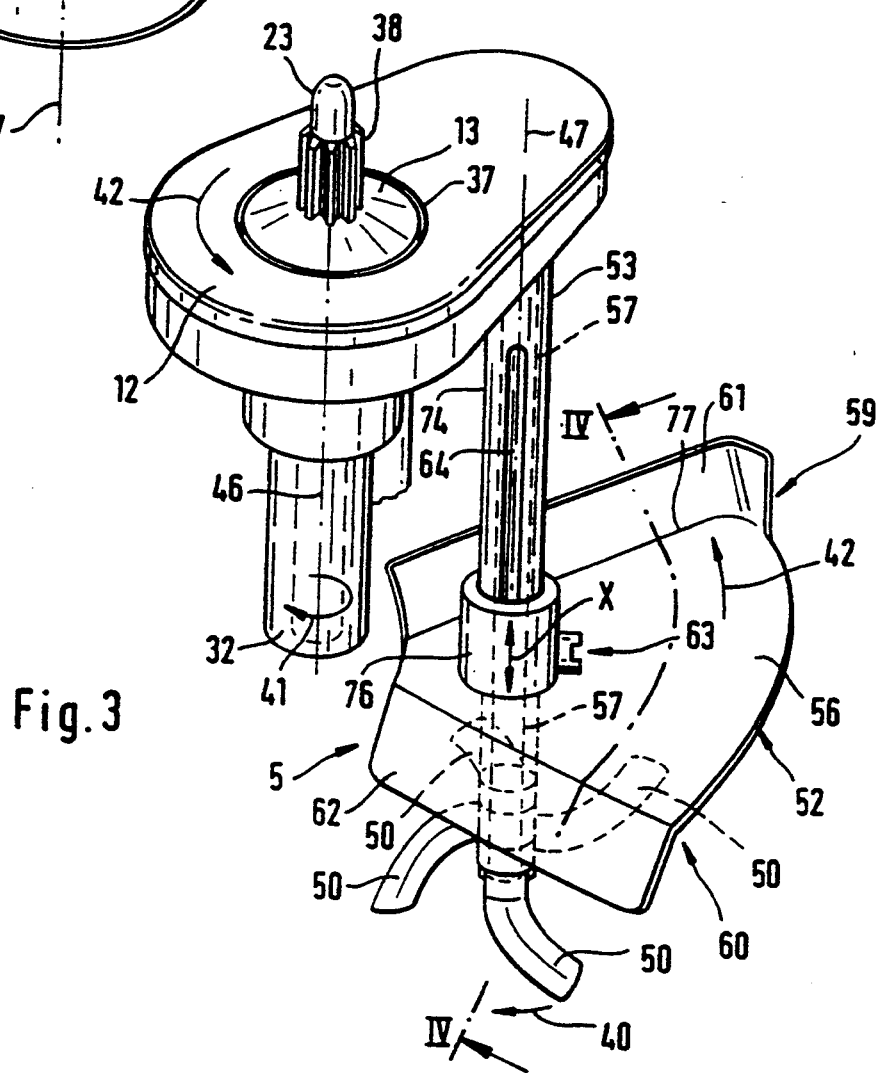

CHOPPING AND MIXING DEVICE FOR MULTI-PURPOSE FOOD PROCESSOR

This invention relates to a chopping and mixing device for a multi-purpose food processor, with a gear arrangement including a gear arm and adapted to be mounted in a bowl, the gear arrangement further including an input shaft rotated by a main shaft driven by a motor of the multi-purpose food processor, and an output shaft mounted on the gear arm outside the input shaft and engageable with at least one processing tool rotary about its axis for performing food processing operations.

From EP-0 217 132 B1, a chopping and mixing device for a multi-purpose food processor is known which is equipped with a whipper unit operable for whipping cream, with the first processing tool being driven by a motor-driven main shaft, by a gearing received in a drivable gear housing, and by an output shaft. Further, the first processing tool cooperates with a second processing tool configured as a deflector blade which is provided between the outer wall of the bowl and the whipper unit and is intended to direct food material that has been urged against the bowl wall back toward the processing tool. In this chopping and mixing device, it is regarded as a disadvantage that optimum chopping of food cannot be performed when it is desired to purée or chop and mix boiled potatoes, for example, or similar, more solid foods.

It is an object of the present invention to provide a chopping and mixing device for a multi-purpose food processor which captures also larger-sized and more solid food items contained in the bowl with utmost speed, chopping and mixing them well instantly, yet also performing a blending function.

According to the present invention, this object is solved in that the processing tool is formed by at least one rotary cutter. The use of a rotary cutter enables a multi-purpose food processor for the first time to purée food contained in the bowl, that is, the food is blended and simultaneously chopped by the sharp cutting blades. This obviates the necessity of providing in the household a separate puréeing rod powered by an electric motor.

In order to be able to direct the food contained in the bowl back to the cutter particularly rapidly when the bowl itself is not of the rotary type, it is suggested in a further feature of this invention that the rotary cutter cooperate with at least one feed and expel device suitably directing the food. While this feed and expel device protects the cutter from outside, it also enables food to be puréed with particular speed and efficiency by directing the food instantly towards the cutter and away from the cutter again following processing. This circulation of food is maintained sufficiently small to perform a rapid puréeing action. It will be understood, of course, that this chopping and mixing device is equally suitable for chopping herbs or other vegetables which is advantageous in preparing green herb sauce.

In order that not only the feed and expel device itself, in cooperation with the cutter, draws in the food and transports it away again following processing, it is provided in a further feature of this invention that, in addition to the rotation of the cutter, the gear arm rotates within the bowl about the main drive shaft of the multi-purpose food processor. By virtue of the fact that the feed and expel device and the cutter are arranged on the rotary gear arm, these rotate within the bowl and are thus able to capture all food materials instantly also where larger bowl diameters are utilized. The mixing action is thereby enhanced still further and the chopping of food can be performed with greater speed. A rotary gear arm is recommended particularly with bowls whose receiving chamber is substantially larger than the space resulting from the processing tool reaching into the receiving chamber of the bowl.

In order to enable the food to be mixed and chopped still more thoroughly and rapidly, a still further advantageous feature of this invention provides for rotation of the cutter in a clockwise direction while the gear housing rotates in a counterclockwise direction. Owing to the opposed directions of rotation of cutter and feed and expel device or gear arm, the food is directed to the feed and expel device in an improved manner, being then instantly captured by the counter-rotating sharp-edged cutter at an increased acceleration so that a particularly efficient cutting action is accomplished.

In a first embodiment, the feed and expel device is comprised of a bell-shaped, downwardly open housing structure arranged radially about the cutter. A bell structure of this type has proven to be particularly successful with the immersion blenders that have been commercially available from the applicant for many years, enabling food materials to be chopped and mixed or puréed rapidly.

In addition, it is advantageous that the gearing received in the gear housing is comprised of a drive gear for engagement with the output shaft for the cutter configured as a plug-in shaft, an intermediate gear, and a pinion mounted on the main drive shaft, with the intermediate gear, through a second pinion integrally formed therewith, being in driving connection with a further, fourth stationary gear arranged above the first pinion for driving the gear housing.

An additional possibility of providing a stationary gear is afforded in a further feature of the device of this invention according to which the fourth gear is received in the lid of the food processor and mounted on a trunnion of the first pinion. Further it is advantageous that the intermediate gear is rotatably supported upon an axle having its one end carried in the cover while its other end is received in the bottom of the gear housing. In a further aspect of this invention, it is advantageous that the intermediate gear in the gear housing turns on the fourth gear, driving the gear housing. This provides a simple means of rotating the gear housing.

A still further possibility afforded by a further feature of the device of this invention consists in that the transmission ratio of the gearing pinion disposed on the main drive shaft to the intermediate gear is at least 1 to 2. This produces optimum mixing results, causing the food to be uniformly puréed in the entire receiving chamber of the bowl. It is further advantageous that the pinion disposed in the gear housing is driven to rotate in the same direction as the cutter.

Particularly advantageously, a deflector extending from the gear housing down into the interior of the bowl is provided between the feed and expel device and the input shaft. The deflector serves the function of directing food to the cutter in addition to the feed and expel device, resulting in a still more thorough mixing and chopping of the food. This applies particularly when the cutter rotates in a counterclockwise direction while the gear housing rotates in a clockwise direction.

In order that as little food as possible is left on the supporting structure provided centrally within the bowl, it will be advantageous to provide the deflector with an approximately vertical inner edge extending about equidistantly or parallel to the outer periphery of the supporting structure of the bowl surrounding the drive shaft. In this arrangement, the deflector is advantageously fixedly connected with the rotatably mounted gear housing.

To enable the food to enter and leave the chamber formed in the interior of the bell structure rapidly, in a further feature of the present invention the bell-shaped and downwardly open housing structure is provided with circumferentially spaced slots.

In a second embodiment of the feed and expel device, it is formed by a plate arranged above the cutter and extending essentially parallel to the bottom of the bowl, with angled end portions being provided in the leading and trailing area of the plate when viewed in the circumferential direction, with the leading end portion extending away from the bottom and the trailing end portion extending towards the bottom. In contrast to the bell-shaped housing structure open in downward direction, this feed and expel device admits substantially more food also from the side, so that it is especially well suited for the chopping and mixing of herbs and other vegetables. The feed and expel device configured as a plate is adapted for universal use, feeding both liquid and more solid food items to the rotating cutter rapidly, whereby excellent chopping or mixing results are obtained.

By virtue of the fact that the leading end portion of the plate is bent away from the bottom, more food is directed to the cutter similar to the action of a snowplow, speeding up the processing operation. The trailing end portion is bent towards the bottom, producing a certain accumulation of food on the cutter whereby still more thorough mixing or chopping operations may be performed on it, until the end portion deflects the food materials downwardly, urging them towards the bottom to thus leave the range of action of the feed and expel device, until they are again captured by the cutter on one of the next revolutions. Where relatively liquid food is processed, it will be captured by the cutter on nearly each revolution of the feed and expel device inside the bowl; when herbs or similar, more solid food items are involved, it may happen that these are not captured again until after more than one revolution of the feed and expel device, because the trailing end portion invariably pushes ahead of it a certain amount of food. The amount of angularity of the angled trailing end portion and the property of the food determine the throughput of food passing through the feed and expel device.

To be able to determine the building up of accumulations of food or the throughput of food on the feed and expel device by hand, it is suggested in a further feature of this invention to make the feed and expel device vertically adjustable relative to the cutter. Accordingly, the higher the elevation at which the feed and expel device is positioned relative to the cutter, the less accumulation of food will build up on the cutter, but also the less thorough will the chopping or mixing action be. In this arrangement, it will be advantageous to arrange the driven shaft in a tubular member fastened to the gear arm, on which tubular member the feed and expel device is slidably mounted. The tubular member surrounding the driven shaft for the cutter affords ease of integration with the gear arm, so that a simple guide results for the feed and expel device which rides upwardly along the tubular member, that is, away from the food, in proportion to the increasing impact of the food material acting against the plate and the angled end portions during rotation of the gear arm within the bowl. As the plate rotates inside the bowl, it is thus virtually carried by the food, that is, at a specific rotational frequency of the plate and considering its weight and the food to be processed, the plate will position itself at an elevation relative to the cutter at which optimum chopping or mixing results are obtained.

In a further feature of this invention, a locking device is provided between the tubular member and the feed and expel device. This locking device enables the plate with its end portions to be secured to the tubular member in any position relative to the cutter. The closer the plate to the cutter and the more solid the food, the higher is the amount of energy to be expended by the food processor for chopping or mixing the food. This power requirement is lower with a plate riding freely along the tubular member, because the plate is then in a position to yield to the resistance of the food when the pressure acting on it becomes too great.

In order to ensure that the end portions extend invariably in the same direction circumferentially and radially to the center of the bowl or the main drive shaft of the food processor, that is, to ensure that the plate with its end portions is not twisted relative to the tubular member, it is suggested to provide on the tubular member at least one groove extending parallel to the axis for engagement with a projection provided on the feed and expel device.

Two embodiments of the present invention will now be described in more detail in the following with reference to the accompanying drawings. In the drawings, FIG. 1 is a perspective view of a multi-purpose food processor including the chopping and mixing tool of the invention for chopping, mixing, beating or puréeing food, including a first embodiment of a feed and expel device;

FIG. 2 is an enlarged perspective view looking toward the bottom of the first chopping and mixing tool of FIG. 1, with the gear arm being omitted;

FIG. 3 is a perspective view looking toward the top of a second embodiment of a chopping and mixing tool, including a gearing and a second embodiment of the feed and expel device;

FIG. 4 is a partial sectional view of the chopping and mixing device, taken along the line IV—IV of FIG. 3.

Figure 1:
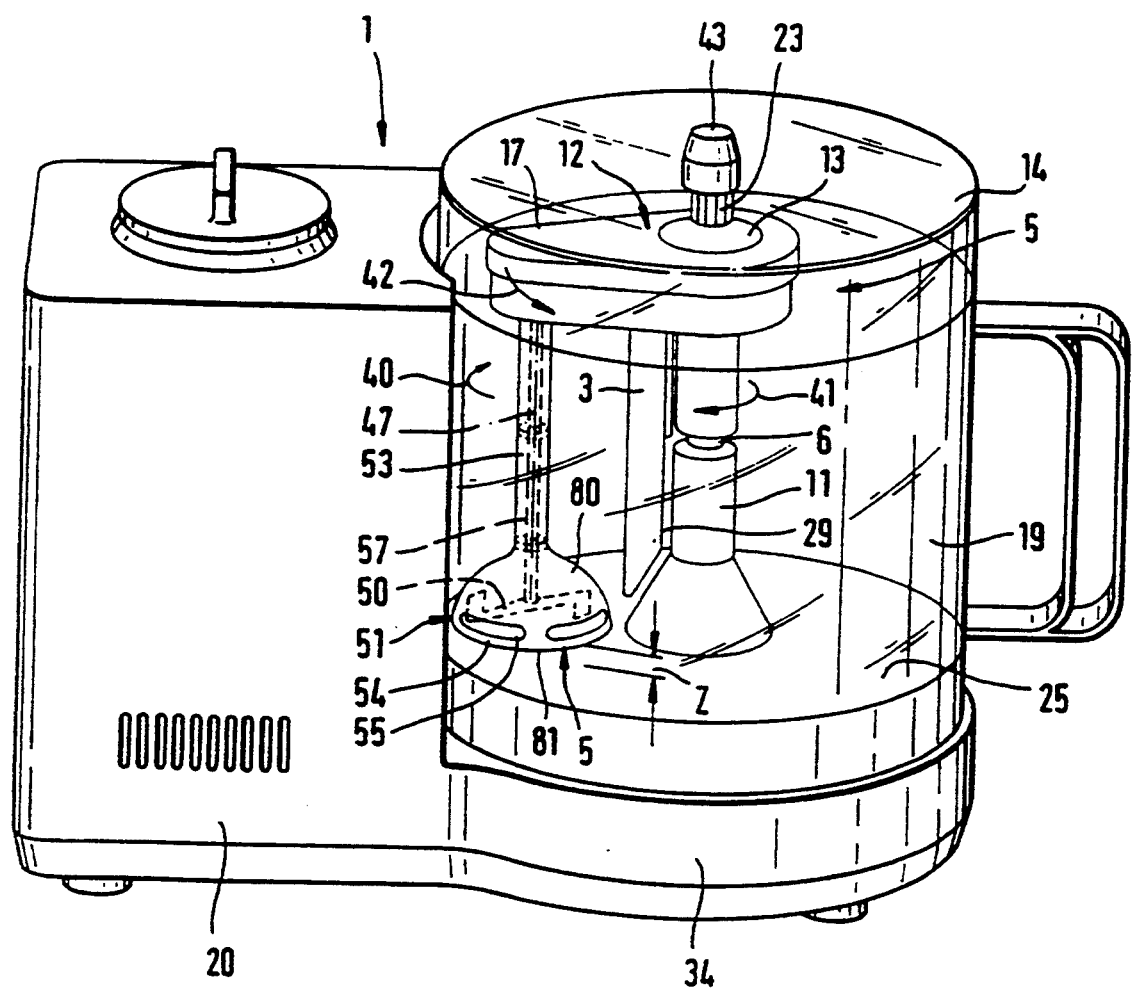
Figure 5:
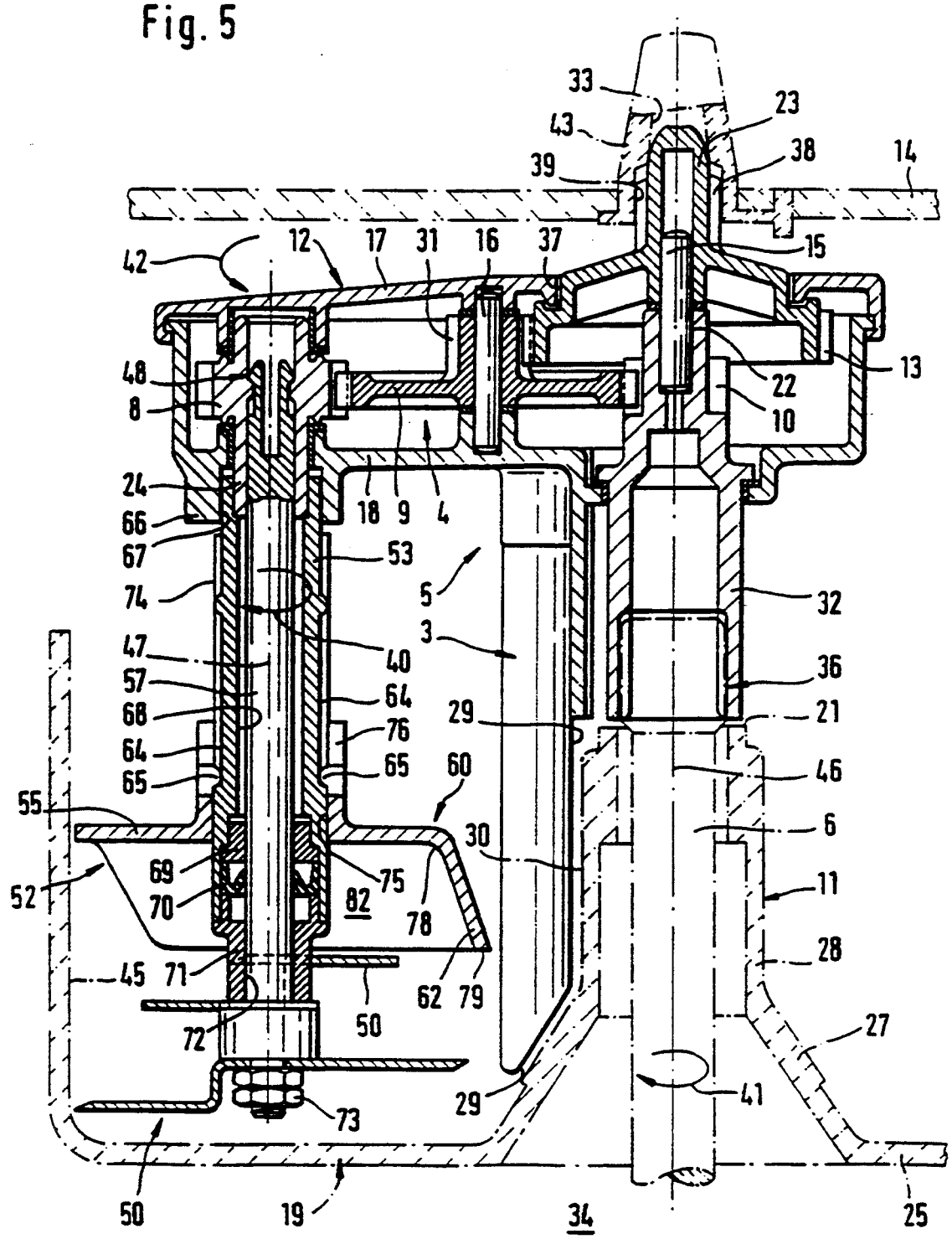
FIG. 5 is a longitudinal sectional view of the chopping and mixing device of FIG. 3, showing it as if it were inserted into the multi-purpose food processor according to FIG. 1.

Referring now to FIG. 1, reference numeral 1 designates a multi-purpose food processor comprising a motor housing 20 arranged on an appliance base 34 and receiving an electric motor driving through a gear arrangement not shown in the drawing a main drive shaft 6 which is adapted to receive in a non-rotating relationship the chopping and mixing device 5 of FIG. 5 by means of a coupling arrangement 36.

According to FIG. 1, the food processor 1 further includes a bowl 19 located centrally on the appliance base 34 and serving to receive food for chopping, beating or mixing by a rotary cutter 50 provided on the chopping and mixing device 5. The chopping and mixing device 5 of FIG. 5 is in rotary connection with the main drive shaft 6 of the multi-purpose food processor 1 through a gearing 4 (FIG. 3). Provided on a gear housing 12 is a deflector 3 rotating concomitantly therewith.

As becomes apparent from FIG. 5, the driving mechanism of the chopping and mixing device 5 further comprises an input shaft 32 extending from the bottom 18 of the gear housing 12 downwardly and adapted to be coupled to the main drive shaft 6 in a non-rotating relationship thereto by the coupling arrangement 36, with the main drive shaft 6 being in driving connection with the electric motor not shown in the drawing through a toothed belt drive. In this arrangement, the main drive shaft 6 is passed through a well 11 centrally located within the bowl 19, extending out of the upper end 21 of the well 11 into the bowl 19. In the area of the bottom 25 of the bowl, the well 11 is comprised of a frusto-conically tapering well portion 27 and an adjoining cylindrical tubular portion 28 which extend concentrically with the center line 46 of the bowl 19.

Coupled to the main drive shaft 6 when viewing FIG. 5 is the input shaft 32 having at its upper end in the gear housing 12 a first pinion 10 including at its upper end a bore 22 for engagement with a trunnion 15 on which a gear 13 is mounted. The gear 13 extends through a bore 37 in the cover 17 of the gear housing 12 and has at its upper end a bearing journal 23 integrally formed on the cover 17 and carried in a bearing bush 43 provided in a bore 33 in the lid 14 of the bowl 19. In this arrangement, teeth 38 formed on the bearing journal 23 engage corresponding teeth 39 in the bore 33 in a non-rotating relationship thereto.

In FIGS. 3 and 5, the chopping and mixing tool 5 laterally adjoins the gear housing or the gear arm 12 in which the gearing 4 is received. According to FIG. 5, the gearing 4 includes a drive gear 8 with an output shaft 24 for connection with the driven shaft 57 for the cutter 50 configured as a plug-in shaft, an intermediate gear 9, and the pinion 10 associated with the main drive shaft 6.

According to FIG. 5, the gear 9 having a diameter greater than the drive gear 8 and the pinion 10 intermediate which it is located includes an integrally formed second pinion 31 turning on the stationary gear 13, thereby driving the gear housing or the gear arm 12 in opposition to the output direction. The intermediate gear 9 is rotatably mounted on an axle 16 having its one end received in the cover 17 and its other end in the bottom 18 of the gear housing 12. The driven shaft 57 is adapted to be coupled to the drive gear 8 in a non-rotating relationship thereto by a coupling means 48, so that both parts rotate about the axis 47.

In FIG. 5, the bottom 18 of the gear arm 12 is provided with a downwardly protruding, tubular collar 66 having a bore 67 receiving a tubular member 53 fastened in a non-rotating relationship to the tubular collar 66 by fastening means not shown in the drawing. According to FIG. 5, the tubular member 53 extends concentrically with the axis 47 in the direction of the bowl bottom 25 and has a longitudinal bore 68 in which the driven shaft 57 is received or mounted in a bearing 69 provided in the lower portion. Provided in the longitudinal bore 68 adjacent to the bearing 69 in downward direction when viewing FIG. 5 is a rotary shaft lip seal 70 preventing the ingress of contaminants and water into the gearing 4 through the longitudinal bore 68. The tubular member 53 terminates in a tubular cap 71 having a bore 72 serving equally as a second bearing for the driven shaft 57.

Projecting below the cap 71 when viewing FIG. 5 is the free end of the driven shaft 57 to which the diametrically opposed cutting blades 50 are fastened by means of a bolted connection 73. Within the lower area of the bowl 19, the cutting blades 50 are arranged on the driven shaft 57 at different elevations in the longitudinal direction of the axis 47, with the lower blade 50 being disposed above the bottom 25 of the bowl 19 at a small relative distance thereto.

A plate 56 having a bore 75 therein is axially slidably guided on the circumferential cylindrical surface 74 of the tubular member 53. The bore 75 is provided in a tubular collar 76. The tubular collar 76 has projections 65 protruding from the bore 75 for engagement in corresponding grooves 64 extending along the axis 47 on the circumferential surface 74. As a result, the plate 56 is non-rotatable relative to, yet slidably guided on, the tubular member 53.

According to FIGS. 3 to 5, the plate 56 has in its leading area 59 an end portion 61 directed upwardly in the direction of the gear arm 12 (FIGS. 3 and 4), its bend 77 extending essentially radially to the center line 46. Further, in the trailing area 60 of the plate 56 remote from the tubular member 53, a further rear end portion 62 is provided which in FIG. 5 is bent towards the bottom 25 of the bowl 19, its bend 78 extending equally essentially radially to the center line 46. The lower edge 79 of the end portion 62 extends above the upper cutting blade 50 at a small relative distance thereto, so that also this cutting blade 50, in revolving about the center line 46 within the bowl 19, will be brought into sufficient contact with the food to be processed. The cutting blades 50 extend outwardly in crescent-shaped fashion in opposition to the direction of rotation 40.

According to FIGS. 1 and 2, the first chopping and mixing tool 5 is equally comprised of a tubular member 53 which, as shown in FIG. 5, is fastened to the gear arm 4 in a like fashion. The driven shaft 57 extends within the tubular member 53, protruding into the receiving chamber 80 formed by the bell-shaped housing structure 54. The bell-shaped housing structure 54 has on its circumference slots 55 extending horizontally to the bottom 25 of the bowl 19, four slots being spaced uniformly apart on the circumference in FIGS. 1 and 2. The cutter 50 formed of two essentially diametrically opposed blades is fastened to the end of the driven shaft 57 within the receiving chamber 80.

As becomes further apparent from FIG. 3, the plate 56 is adapted to be secured to the tubular member 53 by means of a locking device 63 configured as a screw after the plate 56 is pushed over the tubular collar 76 along the tubular member 53 in the direction X.

As appears from FIG. 5 further, the driven shaft 57 with the associated cutter is rotated in a direction opposite to the direction of rotation of the gear housing 12 by the pinion 10 arranged in the gear housing 12, the intermediate gear 9, the drive gear 8, and the output shaft 24. Accordingly, as FIGS. 1, 3 and 5 clearly show, the cutter 50 revolves clockwise in the direction indicated by the arrow 40, the gear housing 12 revolves counterclockwise in the direction indicated by the arrow 42, and the input shaft 32 rotates again in a clockwise direction as indicated by the arrow 41.

In FIG. 5, the deflector 3 includes an approximately vertical inner edge 29 extending about equidistantly parallel to the surface 30 of the well 11 (FIG. 3). As a result, the food material (not shown) clinging to the surface 30 of the well 11 is constantly removed and directed back to the cutter 50.

The mode of operation of the chopping and mixing tool when utilized in the food processor is as follows.

When the food processor 1 of FIG. 1 is turned on, the cutter 50 will revolve both about its own axis 47 in a clockwise direction as indicated by the arrow 40 and, in conjunction with the feed and expel device 51 mounted on the gear arm 12, about the center line 46 in a counterclockwise direction as indicated by the arrow 42. The food collecting on the bottom 25 of the bowl 19 will enter the receiving chamber 80 of the bell-shaped housing structure 54 to be captured and chopped by the cutter 50. Because the free end, that is, the forward edge 81 of the housing structure 54 extends at a distance Z to the bottom 25 of the bowl 19, sufficient food is admitted to the receiving chamber 80, however, only when the food particles are relatively small. Therefore, the feed and expel device illustrated in FIGS. 1 and 2 is essentially only suitable for highly liquid to semiliquid food that is adapted to be directed to and away from the cutter 50 through the slots 55.

For larger-sized food particles, the chopping and mixing tool incorporating the feed and expel device 52 illustrated in FIGS. 3 to 5 is suitable, because of the ability of its leading end portion 61, when viewed in the circumferential direction, to capture and subsequently direct to the cutter 50 a large quantity of food. The end portion 62 provided at the trailing end 60 is bent towards the bottom, so that the food items entering the receiving chamber 82 below the plate 56 are slowed down by the trailing end portion 62 when viewed in the direction of rotation 42, being retained in the receiving chamber 82 until they are sufficiently chopped by the cutter 50 whereupon they are again discharged from the receiving chamber 82. Acting similar to a collecting trough, the leading end portion 61 collects the food while the trailing end portion 62 holds the food contained in the receiving chamber 82 back for a longer period to thus accelerate the chopping as well as the mixing or puréeing action. However, when the feed and expel device 52 of FIG. 5 is moved upwardly along the tubular member 53 until the cutters 50 cease to have the trailing end portion 62 as their lateral boundaries, rotating instead freely inside the bowl 19, the chopping action is less thorough, and the function of the trailing end portion 62 as a baffle plate is reduced.

Following termination of a chopping/mixing action and lifting of the lid 14 from the bowl 19, the chopping and mixing tool may be removed from the bowl 19 to allow the bowl 19 to be emptied.

When other processing tools as dough hooks, grating discs, whisks, cutters, etc. are utilized, the multi-purpose food processor 1 may be employed for other corresponding tasks.

We claim:

1. A chopping and mixing device for use in a multi-purpose food processor that includes a motor, a main shaft driven by the motor, and a bowl having a bottom, said device comprising a gear arrangement adapted to be rotatably mounted in said bowl, said gear arrangement including a gear arm, an input shaft adapted to be rotated by the main shaft, and an output shaft mounted on said gear arm outside said input shaft and engageable with at least one processing tool rotary about its axis for performing food processing operations, said processing tool including rotary cutter structure and a feed and expel device that rotates about said axis, said feed and expel device including a plate structure arranged above the rotary cutter structure, said plate structure having a leading end portion extending away from the bottom of the bowl and a trailing end portion extending towards the bottom of the bowl.

2. The chopping and mixing device of claim 1 wherein said plate structure is adapted to extend essentially parallel to said bottom of said bowl and has angled end portions in its leading and trailing areas when viewed in the circumferential direction.

3. The chopping and mixing device of claim 1 wherein said plate structure is vertically adjustable relative to said cutter structure.

4. The chopping and mixing device of claim 1 wherein said output shaft is arranged in a tubular member fastened to said gear arm and said feed and expel device is slidably mounted on said tubular member.

5. The chopping and mixing device of claim 4 and further including a locking device between said tubular member and said feed and expel device.

6. The chopping and mixing device of claim 4 and further including at least one groove on said tubular member extending parallel to the axis of said tubular member for engagement with a projection on said feed and expel device.

7. The chopping and mixing device of claim 1 and further including deflector structure adapted to extend from said gear arrangement down into the interior of the bowl between said feed and expel device and said input shaft, said deflector structure serving to direct food toward the feed and expel device during operation.

8. The chopping and mixing device of claim 7 wherein said deflector structure has an approximately vertical inner edge extending about parallel to said drive shaft.

9. The chopping and mixing device of claim 7 wherein said deflector structure is fixedly connected with said rotatably mounted gear arrangement.

10. The chopping and mixing device of claim 1 wherein in addition to the rotation of said cutter structure, said gear arm is adapted to rotate within the bowl about said main drive shaft of the multi-purpose food processor.

11. The chopping and mixing device of claim 10 wherein rotation of said cutter structure is in a first direction while said gear arrangement is adapted to rotate in a direction opposite said first direction.

12. The chopping and mixing device of claim 10 wherein said gear arrangement further comprises a drive gear for engagement with said output shaft for said cutter structure configured as a plug-in shaft, an intermediate gear, and a first pinion adapted to be mounted on said main drive shaft, and said intermediate gear, through a second pinion integrally formed therewith, is in driving connection with a further, fourth stationary gear arranged above said first pinion for driving said gear arrangement.

13. The chopping and mixing device of claim 12 wherein said fourth gear is received in a lid of the food processor and mounted on a trunnion of said first pinion.

14. The chopping and mixing device of claim 12 wherein said intermediate gear is rotatably supported upon an axle having its one end carried in the cover while its other end is received in the bottom of said gear arrangement.

15. The chopping and mixing device of claim 12 wherein said second pinion formed on said intermediate gear turns on said fourth stationary gear in said gear arrangement, driving said gear arrangement.

16. The chopping and mixing device of claim 12 wherein the transmission ratio of the first pinion to said intermediate gear is at least 1 to 2.

17. The chopping and mixing device of claim 12 wherein said first pinion disposed in said gear arrangement is driven to rotate in the same direction as said cutter structure.

* * * * *